Figures 1, 2:
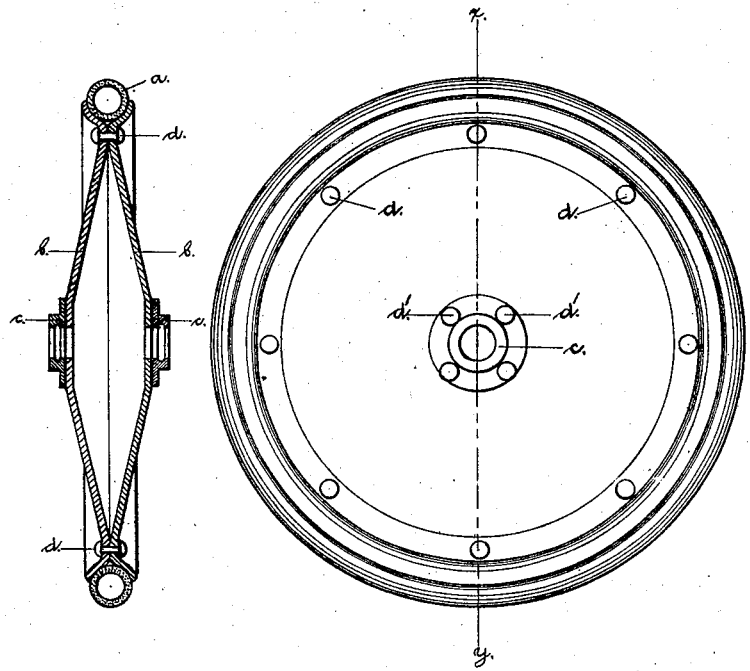

(No Model.)

L. B. SMYSER.
WHEEL FOR BICYCLES OR OTHER VEHICLES.

No. 574,499. Patented Jan. 5, 1897.

Witnesses  
Murray H. Smith  
F. Thenncke

Inventor  
Louis B. Smyser  
By Attorney  
James R. Rogers

THE NORRIS PETERS CO., PHOTO-LITHO., WASHINGTON, D. C.

UNITED STATES PATENT OFFICE.

LOUIS B. SMYSER, OF PHILADELPHIA, PENNSYLVANIA, ASSIGNOR OF ONE-HALF TO WILLIAM H. McFADDEN, OF SAME PLACE.

WHEEL FOR BICYCLES OR OTHER VEHICLES.

SPECIFICATION forming part of Letters Patent No. 574,499, dated January 5, 1897.

Application filed May 22, 1896. Serial No. 592,630. (No model.)

*To all whom it may concern:*

Be it known that I, LOUIS B. SMYSER, a citizen of the United States, residing at Philadelphia, in the county of Philadelphia and State of Pennsylvania, have invented certain new and useful Improvements in Wheels for Bicycles or other Vehicles; and I do hereby declare the following to be a full, clear, and exact description of the invention, such as will enable others skilled in the art to which it appertains to make and use the same.

My invention relates to improvements in wheels for bicycles and other vehicles; and the object of my improvement is to provide a strong, durable, and light wheel, easily constructed and made at the minimum cost. I attain this object by the construction illustrated in the accompanying drawings, in which—

Figure 1 is a vertical section through the hub on the line $x\,y$ of Fig. 2, showing the pneumatic tire in cross-section; and Fig. 2 is an elevation illustrating a completed wheel ready for use.

Similar letters refer to like parts throughout the views.

$a$ represents the pneumatic tire, made of rubber or any suitable material.

$b\,b$ show the vulcanized fiber disks; $c\,c$, the steel hubs, riveted to the center of the said disks $b\,b$ with rivets $d'\,d'$ on the outside thereof, so as to register with the holes made in the center of the said disks, through which the driving and crank shafts, carrying the sprocket-wheels, and over which the sprocket-chain for driving the vehicle passes. The fiber disks are riveted together near their peripheral edges by means of the rivets $d\,d$, and the peripheral edges thereof beyond said rivets $d\,d$ are flared outwardly from each other, forming a seat in which the pneumatic tire rests and is securely held. The great advantage accruing from my invention is a very strong, light, yet durable and comparatively inexpensive wheel for bicycles and other vehicles which is made of vulcanized fiber. Papier-mâché, veneers, and paper-board may be employed, but I prefer to construct my wheel of vulcanized fiber.

Having fully described my invention, what I claim, and desire to secure by Letters Patent, is—

1. In wheels for bicycles and other vehicles, the fiber dished plates or disks $b, b$, riveted together near their peripheral edges by means of the rivets $d, d$, and bulged at their centers, and having central perforations, hubs $c, c$, surrounding the same, and riveted thereto, the said disks $b, b$, flared at their extreme peripheral edges, thereby forming a seat for the pneumatic tire, substantially as herein shown and described.

2. In wheels for bicycles and other vehicles, the centrally-perforated, vulcanized fiber disks $b, b$, bulged outwardly at their centers, securely riveted together near their outer edges, and provided on the outer sides, centrally, with hubs $c, c$, riveted thereto, the peripheral edges of the disks flared outwardly forming a seat for the pneumatic tire, substantially as herein shown and described.

In testimony whereof I affix my signature in presence of two witnesses.

LOUIS B. SMYSER.

Witnesses:
WM. J. FERDINAND,
WM. H. HEULINGS, Jr.